(12) United States Patent
Acharya et al.

(10) Patent No.: US 7,241,517 B2
(45) Date of Patent: Jul. 10, 2007

(54) MAGNETIC RECORDING MEDIUM AND MAGNETIC STORAGE APPARATUS

(75) Inventors: B. Ramamurthy Acharya, Cupertino, CA (US); Akihiro Inomata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/936,025

(22) Filed: Sep. 8, 2004

(65) Prior Publication Data

US 2005/0048327 A1 Mar. 3, 2005

Related U.S. Application Data

(63) Continuation of application No. PCT/JP03/00737, filed on Jan. 27, 2003.

(51) Int. Cl.
*G11B 5/66* (2006.01)
(52) U.S. Cl. .................................... 428/829; 428/828.1
(58) Field of Classification Search ................ 428/828, 428/829, 900, 828.1
See application file for complete search history.

(56) References Cited

U.S. PATENT DOCUMENTS

| | | | |
|---|---|---|---|
| 4,631,202 A | 12/1986 | Opfer et al. | |
| 6,602,612 B2 | 8/2003 | Abarra et al. | |
| 6,623,875 B2 | 9/2003 | Inomata et al. | ............. 428/828 |
| 6,635,367 B2* | 10/2003 | Igarashi et al. | ...... 428/694 TM |
| 6,645,646 B1 | 11/2003 | Umeda et al. | |
| 6,689,495 B1 | 2/2004 | Sato et al. | |
| 2001/0024742 A1 | 9/2001 | Bian et al. | |
| 2002/0064689 A1* | 5/2002 | Yamanaka et al. | ... 428/694 TM |
| 2002/0071966 A1 | 6/2002 | Inomata et al. | |
| 2003/0017369 A1 | 1/2003 | Hirayama et al. | ....... 428/835.6 |

FOREIGN PATENT DOCUMENTS

| | | |
|---|---|---|
| EP | 0 145 157 | 6/1985 |
| JP | 62-141628 | 6/1987 |
| JP | 2002-183940 | 6/2002 |
| JP | 2003-16624 | 1/2003 |
| JP | 2002-352407 | 12/2005 |
| WO | WO 02/45080 | 6/2002 |

OTHER PUBLICATIONS

Inomata et al; Advanced synthetic ferromagnetic media (invited); Journal of Applied Physics, vol. 91, No. 10; pp. 7671-7675; May 15, 2002.

(Continued)

*Primary Examiner*—Holly Rickman
(74) *Attorney, Agent, or Firm*—Greer, Burns & Crain, Ltd.

(57) ABSTRACT

A magnetic recording medium is constructed to include a lower magnetic layer, a nonmagnetic spacer layer disposed on the lower magnetic layer, and an upper magnetic layer disposed on the nonmagnetic spacer layer, where the upper and lower magnetic layers are antiferromagnetically coupled. The lower magnetic layer comprises a stabilization layer and a lower enhancement layer disposed between the stabilization layer and the nonmagnetic spacer layer, and the stabilization layer and the lower enhancement layer are ferromagnetically exchange coupled. The stabilization layer and the lower enhancement layer are made of CoCr alloys such that a Pt content of the stabilization layer is higher than that of the lower enhancement layer.

13 Claims, 6 Drawing Sheets

OTHER PUBLICATIONS

Abarra et al., "Longitudinal Magnetic Recording Media with Thermal Stabilization Layers," Applied Physics Letters. vol. 77, No. 16, Oct. 16, 2000. pp. 2581-2583.

Acharya et al., "Contribution of the Magnetic Anistropy of the Stabilization Layer to the Thermal Stability of Synthetic Ferrimagnetic Media," Applied Physics Letters, vol. 80, No. 1, Jan. 7, 2002, pp. 85-87.

Inomata et al., "Exchange Coupling Strength in Synthetic Ferrimagnetic Media," IEEE Transactions on Magnetics, vol. 37, No. 4, Jul. 2001, pp. 1449-1451.

* cited by examiner

| Medium | M1 | M2 | M3 |
|---|---|---|---|
| Hex (Oe) | 750 | 390 | 800 |
| Coercivity (Oe) | 4200 | 4400 | 4450 |
| S/Nm | 12.6 | 12.2 | 13 |
| Siso/Nm (dB) | 22.6 | 22.4 | 22.9 |
| Overwrite (dB) | −40 | −39 | −40.5 |

MAGNETIC RECORDING MEDIUM AND MAGNETIC STORAGE APPARATUS

This application is a continuation of a PCT International Application No. PCT/JP03/00737 filed Jan. 27, 2003 in the English language, in the Japanese Patent Office, the disclosure of which is hereby incorporated by reference.

The PCT International Application No. PCT/JP03/00737 was published under International Publication Number WO 2004/068472 A1 in the English language on Aug. 12, 2004.

BACKGROUND OF THE INVENTION

1. Field of the Invention

The present invention generally relates to magnetic recording media and magnetic storage apparatuses, and more particularly to a magnetic recording medium having magnetic layers which are antiferromagnetically coupled via a nonmagnetic spacer layer, and to a magnetic storage apparatus which uses such a magnetic recording medium.

2. Description of the Related Art

The storage capacity of longitudinal magnetic recording media has been rising rapidly due to reduction of media noise, the development of high-sensitivity spin-valve heads, and high-magnetization write heads. Recording densities above 100 Gbits/inch$^2$ have been demonstrated and such high recording densities are on the verge of being applied for a commercial hard disk drive. The demand for greater recording densities for better performing computers is, however, showing an increasing trend imposing greater challenges for the recording media and other component design.

Lowering media noise involves writing a sharper magnetic transition in the magnetic layer. This is generally achieved by increasing the media coercivity, decreasing the thickness of magnetic layer, decreasing the grain size and grain size distribution of the magnetic layer, and magnetically isolating the grains of the magnetic layer. Decreasing the grain size or decreasing the media thickness, however, adversely affect the thermal stability of the recording media. The thermal stability of the magnetic layer is normally represented by how large the factor KuV/kT is, where Ku denotes the magnetic anisotropy, V denotes the volume of the grain, T denotes the temperature, and k denotes the physical constant known as the Boltzmann constant.

In order to have small grains which are thermally stable, the magnetic anisotropy Ku has to be increased. The magnetic anisotropy field Hk is defined as Hk=2 Ku/Ms, where Ms denotes the saturation magnetization. A large magnetic anisotropy field Hk means a large coercivity Hc at the nanosecond regime where normally the writing of the information occurs for a high-density media with high-data transfer rates. High coercivity Hc at writing frequencies puts severe limitations on the write heads, as a large write current is required in order to write information on such media. Write currents, which can be produced by write heads, are severely limited due to difficulties in developing high magnetic moment write heads. The overwrite performance, which is the ability to write new data on previously written data, is worse for recording media with higher magnetic anisotropy field Hk. Recording media with a higher magnetic anisotropy Ku increases the magnetic anisotropy field Hk and thus restricts the overwrite performance.

As described above, there is need to decrease the grain sizes of the magnetic layer and the thickness of the magnetic layer in order to achieve low media noise and hence a high density recording performance. However, such reduction of grain size and magnetic layer thickness deteriorates the thermal stability of the recording medium. In order to improve the thermal stability without effecting the overwrite performance, a synthetic ferrimagnetic media (SFM) has been proposed and demonstrated, as discussed by Abarra et al., in Applied Physics Letters, Vol.77, Page 2581, October 2000.

A synthetic ferrimagnetic media (SFM) has at least one pair of magnetic layers, which are separated by a nonmagnetic spacer made of Ru or the like. The magnetization of the upper magnetic layer is partially cancelled by the lower magnetic layer which functions as an initial stabilizing layer. While the read head is sensitive only to the effective magnetization, a total volume of the two magnetic layers contributes to the thermal stability. Using this concept of the SFM, the signal-to-noise ratio (SNR) and thermal stability of the recording media are greatly improved. However, it is desirable to further improve the thermal stability so as to achieve higher recording densities.

SUMMARY OF THE INVENTION

Accordingly, it is general object of the present invention to provide a novel and useful magnetic recording medium and magnetic storage apparatus, in which the problems described above are solved and the demands are satisfied.

Another and more specific object of the present invention is to provide a magnetic recording medium and a magnetic storage apparatus, which have improved SNR, improved overwrite performance, and improved thermal stability.

Still another object of the present invention is to provide a magnetic recording medium comprising a lower magnetic layer; a nonmagnetic spacer layer disposed on the lower magnetic layer; and an upper magnetic layer disposed on the nonmagnetic spacer layer, where the upper and lower magnetic layers are antiferromagnetically coupled, the lower magnetic layer comprises a stabilization layer and a lower enhancement layer disposed between the stabilization layer and the nonmagnetic spacer layer, the stabilization layer and the lower enhancement layer are ferromagnetically exchange coupled, and the stabilization layer and the lower enhancement layer are made of CoCr alloys such that a Pt content of the stabilization layer is higher than that of the lower enhancement layer. According to the magnetic recording medium of the present invention, it is possible to realize improved SNR, improved overwrite performance, and improved thermal stability.

A further object of the present invention is to provide a magnetic recording medium comprising a lower magnetic layer; a nonmagnetic spacer layer disposed on the lower magnetic layer; and an upper magnetic layer disposed on the nonmagnetic spacer layer, where the upper and lower magnetic layers are antiferromagnetically coupled, the upper magnetic layer comprises an upper enhancement layer disposed on the nonmagnetic spacer layer and a recording layer disposed on the upper enhancement layer, the recording layer and the upper enhancement layer are ferromagnetically exchange coupled, and the recording layer and the upper enhancement layer are made of CoCr alloys such that a Pt content of the recording layer is higher than that of the upper enhancement layer. According to the magnetic recording medium of the present invention, it is possible to realize improved SNR, improved overwrite performance, and improved thermal stability.

Another object of the present invention is to provide a magnetic storage apparatus comprising at least one magnetic recording medium; and a head recording information on and reproducing information from the magnetic recording medium, where the magnetic recording medium comprises a lower magnetic layer; a nonmagnetic spacer layer disposed on the lower magnetic layer; and an upper magnetic layer disposed on the nonmagnetic spacer layer, the upper and lower magnetic layers are antiferromagnetically coupled, the lower magnetic layer comprises a stabilization layer and a lower enhancement layer disposed between the stabilization layer and the nonmagnetic spacer layer, the stabilization layer and the lower enhancement layer are ferromagnetically exchange coupled, and the stabilization layer and the lower enhancement layer are made of CoCr alloys such that a Pt content of the stabilization layer is higher than that of the lower enhancement layer. According to the magnetic storage apparatus of the present invention, it is possible to realize improved SNR, improved overwrite performance, and improved thermal stability.

Still another object of the present invention is to provide a magnetic storage apparatus comprising at least one magnetic recording medium; and a head recording information on and reproducing information from the magnetic recording medium, where the magnetic recording medium comprises a lower magnetic layer; a nonmagnetic spacer layer disposed on the lower magnetic layer; and an upper magnetic layer disposed on the nonmagnetic spacer layer, the upper and lower magnetic layers are antiferromagnetically coupled, the upper magnetic layer comprises an upper enhancement layer disposed on the nonmagnetic spacer layer and a recording layer disposed on the upper enhancement layer, the recording layer and the upper enhancement layer are ferromagnetically exchange coupled, and the recording layer and the upper enhancement layer are made of CoCr alloys such that a Pt content of the recording layer is higher than that of the upper enhancement layer. According to the magnetic storage apparatus of the present invention, it is possible to realize improved SNR, improved overwrite performance, and improved thermal stability.

Other objects and further features of the present invention will be apparent from the following detailed description when read in conjunction with the accompanying drawings.

DESCRIPTION OF THE PREFERRED EMBODIMENTS

Figure 1:
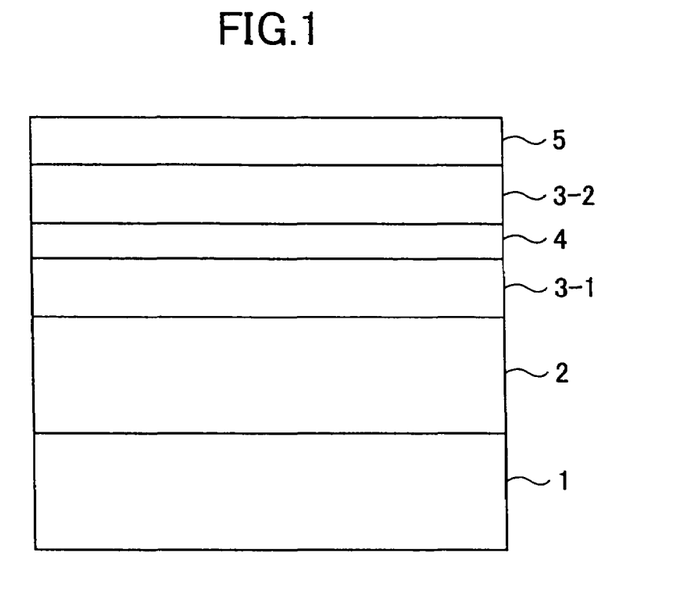
FIG. 1 is a cross sectional view showing an important part of a synthetic ferrimagnetic medium.

FIG. 1 is a cross sectional view showing an important part of a synthetic ferrimagnetic medium (SFM). The magnetic recording medium includes a substrate 1, a Cr or Cr alloy underlayer 2, a lower magnetic layer 3-1, a nonmagnetic spacer layer 4, an upper magnetic layer 3-2, and a C or DLC overcoating layer 5, which are stacked as shown in FIG. 1.

Figure 2:
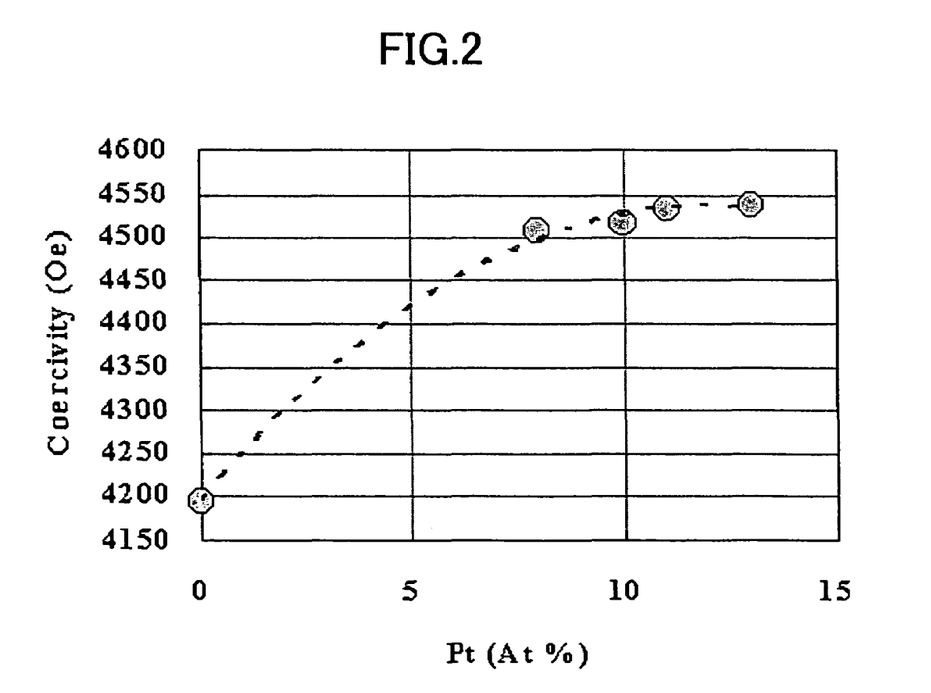
FIG. 2 is a diagram showing the effects of a Pt content of a lower magnetic layer on coercivity for the synthetic ferrimagnetic medium shown in FIG. 1.

FIG. 2 is a diagram showing the effects of a Pt content of the lower magnetic layer 3-1 on coercivity for the synthetic ferrimagnetic medium shown in FIG. 1. In FIG. 2, the ordinate indicates the coercivity (Oe) of the synthetic ferrimagnetic medium, and the abscissa indicates the Pt content x (at %) of the lower magnetic layer 3-1. FIG. 2 shows the coercivity for the lower magnetic layer 3-1 made of $CoCrPt_xB$, with the Pt content x changed from 0 at % to 13 at %. The substrate 1, the underlayer 2, the nonmagnetic spacer 4 and the upper magnetic layer 3-2 respectively were glass, CrMo, Ru and CoCrPtBCu with Pt content of 11 at %. It may be seen from FIG. 2 that the coercivity increases with higher Pt content x.

It is known that the magnetic anisotropy of a CoCrPt alloy increases with increasing Pt content. Acharya et al., Applied Physics Letters, Vol.80, page 85, January 2002, demonstrated that the thermal stability improves and the coercivity increases when the lower magnetic layer of higher magnetic anisotropy is employed. Hence, it may be regarded that the increase in coercivity shown in FIG. 2 for increasing Pt content is due to the increase in the magnetic anisotropy of the lower magnetic layer 3-1.

Figure 3:
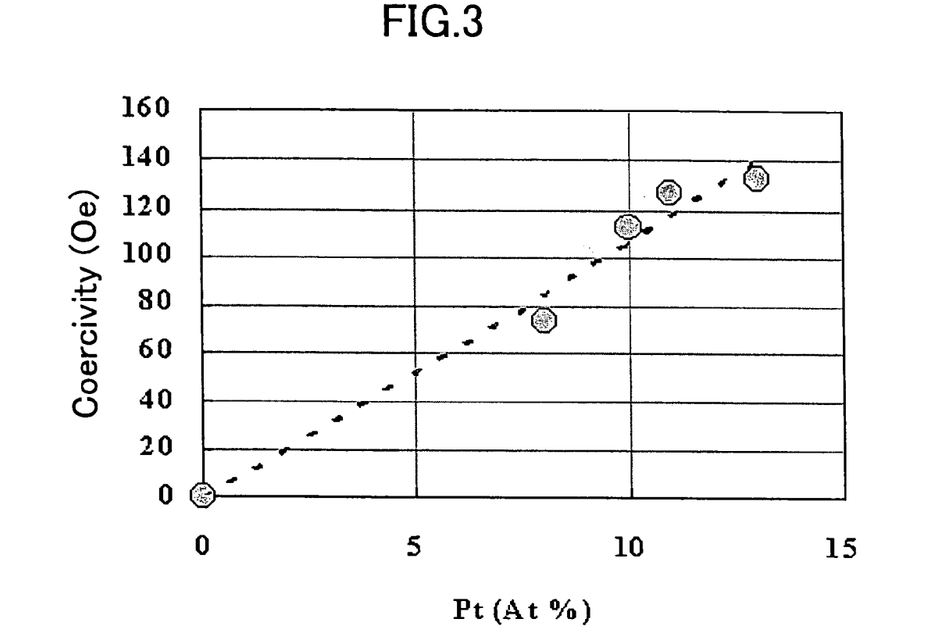
FIG. 3 is a diagram showing the coercivity of the lower magnetic layer as a function of increasing Pt content for the synthetic ferrimagnetic medium shown in FIG. 1.

FIG. 3 is a diagram showing the coercivity of the lower magnetic layer 3-1 as a function of increasing Pt content x. In FIG. 3, the ordinate indicates the coercivity (Oe) of the lower magnetic layer 3-1, and the abscissa indicates the Pt content x (at %) of the lower magnetic layer 3-1. It may be seen from FIG. 3 that the coercivity of the lower magnetic layer 3-1 increases with increasing Pt content x due an increase in the magnetic anisotropy.

Figure 4:
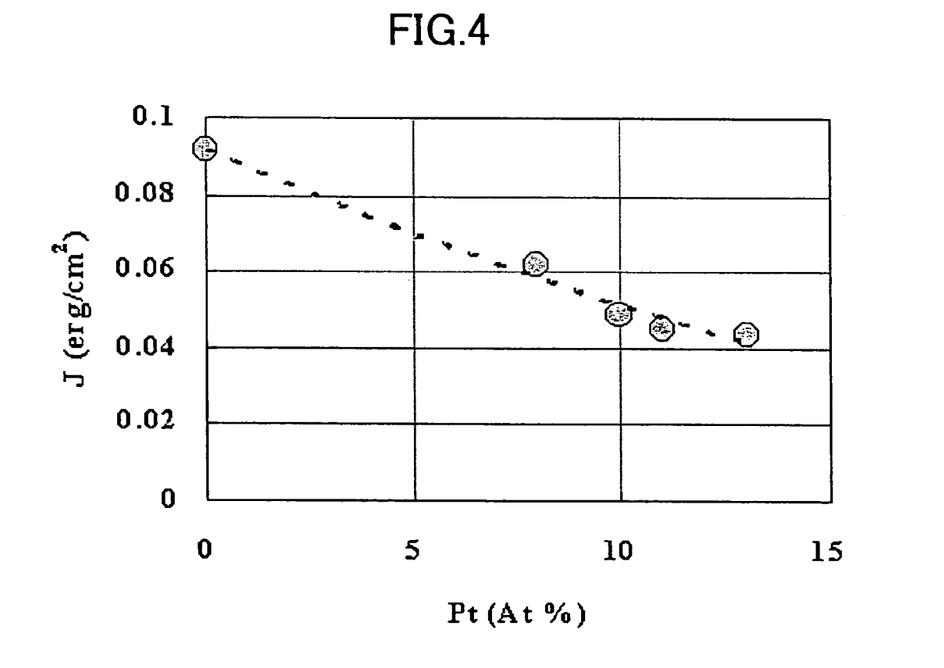
FIG. 4 is a diagram showing the antiferromagnetic exchange coupling constant between the lower and upper magnetic layers as a function of increasing Pt content of the lower magnetic layer for synthetic ferrimagnetic medium shown in FIG. 1.

FIG. 4 is a diagram showing the antiferromagnetic exchange coupling constant J between the lower magnetic layer 3-1 and the upper magnetic layer 3-2 as a function of increasing Pt content x of the lower magnetic layer 3-1. In FIG. 4, the ordinate indicates the antiferromagnetic exchange coupling constant J ($erg/cm^2$) between the lower magnetic layer 3-1 and the upper magnetic layer 3-2, and the abscissa indicates the Pt content x (at %) of the lower magnetic layer 3-1. As may be seen from FIG. 4, the value of the antiferromagnetic exchange coupling constant J decreases with increasing Pt content x.

Figure 5:
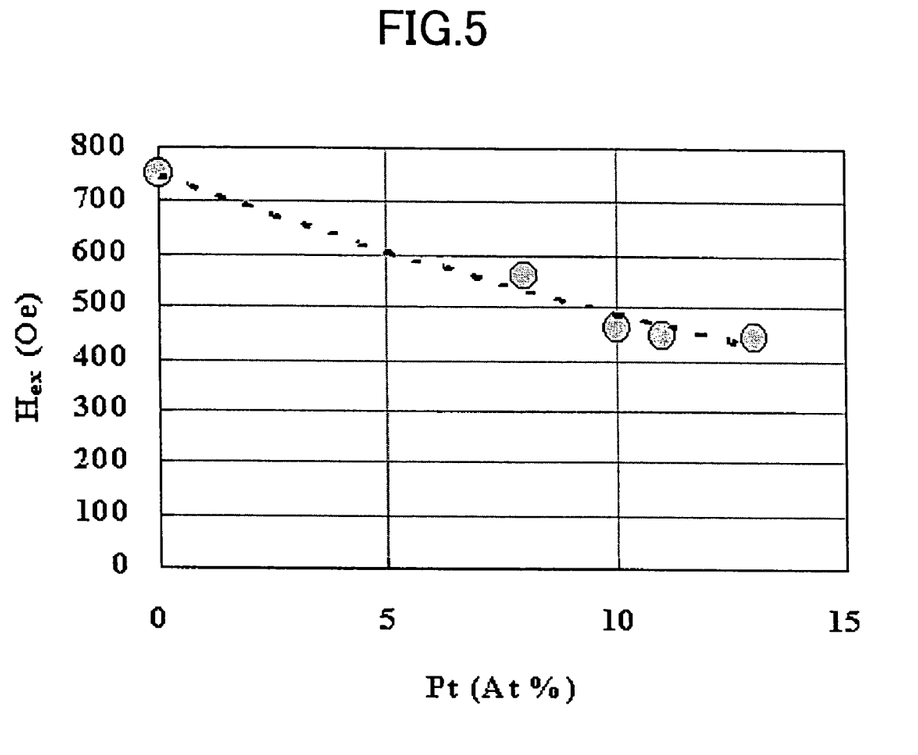
FIG. 5 is a diagram showing the exchange field $H_{ex}$ experienced by the lower magnetic layer as a function of the Pt content x of the lower magnetic layer for synthetic ferrimagnetic medium shown in FIG. 1.

FIG. 5 is a diagram showing the exchange field $H_{ex}$ experienced by the lower magnetic layer 3-1 as a function of the Pt content x of the lower magnetic layer 3-1. In FIG. 5, the ordinate indicates the exchange field $H_{ex}$ experienced by the lower magnetic layer 3-1, and the abscissa indicates the Pt content x (at %) of the lower magnetic layer 3-1. The value of the exchange field $H_{ex}$ is dependent on the antiferromagnetic exchange coupling constant J, and hence decreases with increasing Pt content x in the lower magnetic layer 3-1.

Inomata et al., IEEE Magnetics, Vol.37, page 1449, 2001, demonstrated that the relationship between the exchange field $H_{ex}$ and the coercivity of the lower magnetic layer is important for obtaining optimum performance of synthetic ferrimagnetic medium. Inomata et al. showed that the value of the exchange field $H_{ex}$ should be well over the value of the coercivity of the lower magnetic layer.

From FIGS. 2 through 5, it may be seen that, a higher Pt content x in the lower magnetic layer 3-1 derives higher coercivity and thermal stability for the synthetic ferrimagnetic medium. However, the exchange field $H_{ex}$ decreases due to decrease in the antiferromagnetic exchange coupling constant J which is caused by higher Pt content x in the lower magnetic layer 3-1. Therefore, there is a tradeoff between increasing the Pt content x in the lower magnetic layer 3-1 in order to obtain higher coercivity and thermal stability, and suppressing the increase in the Pt content x of the lower magnetic layer 3-1 in order not to decrease the antiferromagnetic exchange coupling constant J and the exchange field $H_{ex}$.

A magnetic recording medium according to the present invention is designed to overcome the tradeoff described above, so that it is possible to realize a magnetic recording medium of superior performance.

Next, a description will be given of embodiments of the magnetic recording medium and the magnetic storage apparatus according to the present invention, by referring to FIG. 6 and the subsequent drawings.

Figure 6:
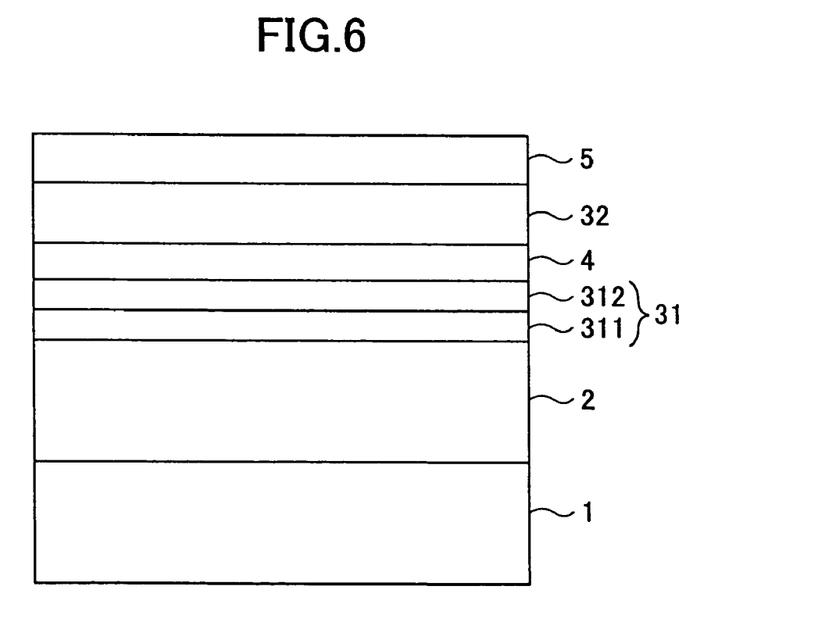
FIG. 6 is a cross sectional view showing an important part of a first embodiment of a magnetic recording medium according to the present invention.

FIG. 6 is a cross sectional view showing an important part of a first embodiment of the magnetic recording medium according to the present invention. In FIG. 6, those parts which are basically the same as those corresponding parts in FIG. 1 are designated by the same reference numerals. The recording medium includes a substrate 1 made of glass or the like, a Cr or Cr alloy underlayer 2, a lower magnetic layer 31, a nonmagnetic spacer layer 4, an upper magnetic layer 32, and a C or DLC over-coating layer 5, which are stacked as shown in FIG. 6. For example, an organic lubricant is coated on the over-coating layer 4. In this embodiment, the lower magnetic layer 31 has a bi-layer structure including a stabilization layer 311 and a lower enhancement layer 312 which is provided on the stabilization layer 311.

The stabilization layer 311 may be made of a CoCrPt alloy such as CoCrPt, CoCrPtB, CoCrPtBCu, CoCrPtTa and alloys thereof. The lower enhancement layer 312 may be made of a CoCrPt alloy such as CoCrPt, CoCrPtB, CoCrPtBCu, CoCrPtTa and alloys thereof. The Pt content in the stabilization layer 311 is higher than the Pt content in the lower enhancement layer 312. Accordingly, the lower enhancement layer 311 may also be made of a material with Pt=0 at %, which may be selected from CoCr alloys such as CoCr, CoCrB, CoCrBCu, CoCrTa, and alloys thereof.

For example, the lower enhancement layer 312 is made of a CoCr alloy with $0 \leq Pt \leq 8$ at %, and the stabilization layer 311 is made of a CoCrPt alloy with Pt>8 at %. In addition, a Co content of the lower enhancement layer 312 is desirably higher than that of the stabilization layer 311. Further, the magnetic anisotropy of the stabilization layer 311 is desirably higher than that of the lower enhancement layer 312.

The substrate 1 may be coated with a NiP layer.

The underlayer 2 may be made of a nonmagnetic material selected from a group consisting of Cr, CrMo, CrTi, CrV, CrW and alloys thereof, with a thickness in a range of approximately 1 nm to 25 nm. Alternatively, the underlayer 2 may be made of a nonmagnetic material selected from a group consisting of NiAl, RuAl and alloys thereof, with a thickness in a range of approximately 5 nm to 80 nm. Furthermore, the underlayer 2 may be made of an alloy with a B2 structure.

The nonmagnetic spacer layer 4 may be made of a material selected from a group consisting of Ru, Ir, Rh and alloys thereof.

The upper magnetic layer 32 has a single-layer structure, and may be made of Co or a Co alloy.

Of course, it is possible to provide additional layers in the magnetic recording medium, such as a seed layer between the substrate 1 and the underlayer 2, and/or an intermediate layer between the underlayer 4 and the lower magnetic layer 31. The intermediate layer may be made of a nonmagnetic material such as a CoCr alloy having a thickness in a range of 1 nm to 5 nm.

According to this first embodiment, the lower magnetic layer 31 and the upper magnetic layer 32 are antiferromagnetically coupled, and the stabilization layer 311 and lower enhancement layer 312 of the lower magnetic layer 31 are ferromagnetically exchange coupled. Hence, the magnetization directions of the upper and magnetic layers 32 and 31 are mutually antiparallel.

Figure 7:
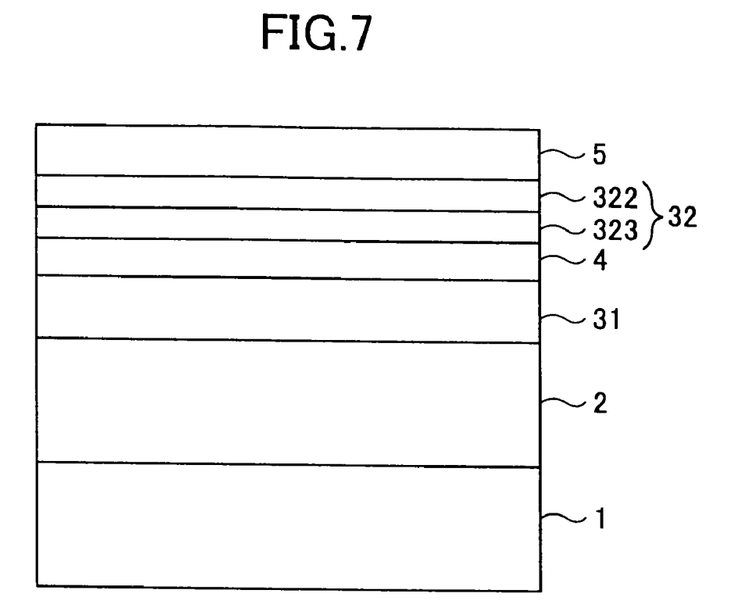
FIG. 7 is a cross sectional view showing an important part of a second embodiment of the magnetic recording medium according to the present invention.

FIG. 7 is a cross sectional view showing an important part of a second embodiment of the magnetic recording medium according to the present invention. In FIG. 7, those parts which are the same as those corresponding parts in FIG. 6 are designated by the same reference numerals. The magnetic recording medium shown in FIG. 7 includes a lower magnetic layer 31, and an upper magnetic layer 32 having a bi-layer structure including an upper enhancement layer 323 and a recording layer 322 which is provided on the upper enhancement layer 323.

The upper enhancement layer 323 may be made of a CoCrPt alloy such as CoCrPt, CoCrPtB, CoCrPtBCu, CoCrPtTa and alloys thereof. The recording layer 322 may be made of a CoCrPt alloy such as CoCrPt, CoCrPtB, CoCrPtBCu, CoCrPtTa and alloys thereof. The Pt content in the recording layer 322 is higher than the Pt content in the upper enhancement layer 323. Accordingly, the upper enhancement layer 323 may also be made of a material with Pt=0 at %, which may be selected from CoCr alloys such as CoCr, CoCrB, CoCrBCu, CoCrTa, and alloys thereof.

For example, the upper enhancement layer 323 is made of a CoCr alloy with $0 \leq Pt \leq 8$ at %. In addition, a Co content of the upper enhancement layer 323 is desirably higher than that of the recording layer 322. Further, the magnetic anisotropy of the recording layer 322 is desirably higher than that of the upper enhancement layer 323.

The lower magnetic layer 31 has a single-layer structure, and may be made of Co or a Co alloy.

According to this second embodiment, the lower magnetic layer 31 and the upper magnetic layer 32 are antiferromagnetically coupled, and the upper enhancement layer 323 and the recording layer 322 are ferromagnetically exchange coupled. Hence, the magnetization directions of the upper and magnetic layers 32 and 31 are mutually antiparallel.

Figure 8:
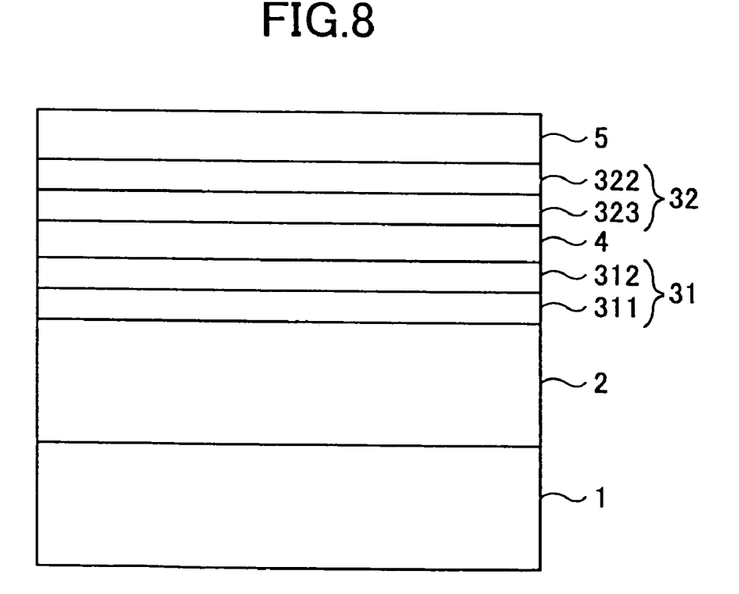
FIG. 8 is a cross sectional view showing a third embodiment of the magnetic recording medium according to the present invention.

FIG. 8 is a cross sectional view showing an important part of a third embodiment of the magnetic recording medium according to the present invention. In FIG. 8, those parts which are the same as those corresponding parts in FIGS. 6 and 7 are designated by the same reference numerals. In the magnetic recording medium shown in FIG. 8, both the lower magnetic layer 31 and the upper magnetic layer 32 have the bi-layer structure described above.

For example, the upper and lower enhancement layers 323 and 312 are made of a CoCr alloy with $0 \leq Pt \leq 8$ at %.

According to the third embodiment, the lower magnetic layer 31 and upper magnetic layer 32 are antiferromagnetically coupled, the stabilization layer 311 and lower enhancement layer 312 are ferromagnetically exchange coupled, and the upper enhancement layer 323 and the recording layer 322 are ferromagnetically exchange coupled. Hence, the magnetization directions of the upper and magnetic layers 32 and 31 are mutually antiparallel.

Figure 9:
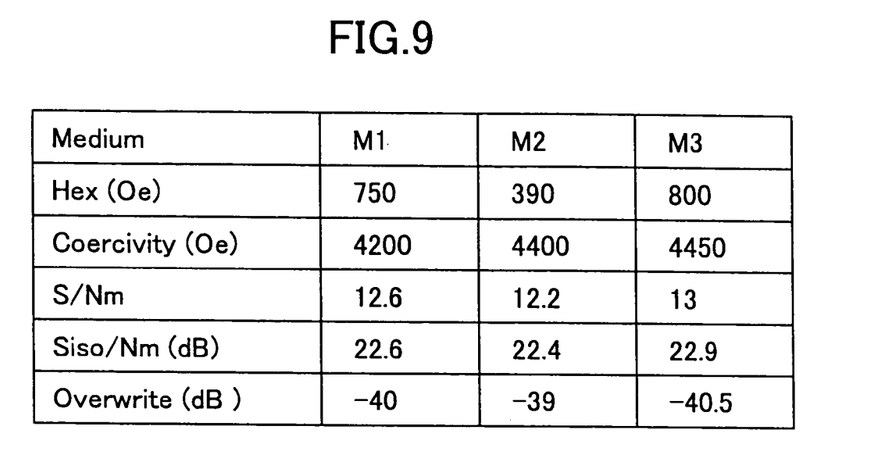
FIG. 9 is a diagram showing various parameters measured with respect to the synthetic ferrimagnetic media and the magnetic recording medium of the first embodiment.

FIG. 9 is a diagram showing various parameters measured with respect to the synthetic ferrimagnetic media and the magnetic recording medium of the first embodiment. The various parameters include the exchange field $H_{ex}$ (Oe), coercivity Hc (Oe), signal-to-medium noise $S/N_m$ at 330 kfci, isolated signal-to-medium noise $S_{iso}/N_m$ (dB) at 330 kfci, and overwrite performance (dB).

In FIG. 9, M1 denotes the synthetic ferrimagnetic medium shown in FIG. 1 with the lower magnetic layer 3-1 made of a 3-nm thick CoCrB alloy with a lowest Pt content of 0 at %. M2 denotes the synthetic ferrimagnetic medium shown in FIG. 1 with the lower magnetic layer 3-1 made of a 3-nm thick CoCrPtB with a higher Pt content of 10 at %. The substrate 1, the underlayer 2, the nonmagnetic spacer layer 4, the upper magnetic layer 3-2 for the synthetic ferrimagnetic media M1 and M2 respectively were glass, CrMo, Ru and CoCrPtBCu with Pt content of 11 at %.

In FIG. 9, M3 denotes the magnetic recording medium of the first embodiment shown in FIG. 6. The stabilization layer 311 is made of a 3-nm thick CoCrPtB with Pt content of 10 at %, and the lower enhancement layer 312 is made of a 1-nm thick CoCrB alloy. The substrate 1, the underlayer 2, the nonmagnetic spacer layer 4 and the upper magnetic layer 3-2 for the magnetic recording medium M3 respectively were glass, CrMo, Ru and CoCrPtBCu with Pt content of 11 at %. It was confirmed that the magnetic recording medium M3 shows higher exchange field $H_{ex}$ than the synthetic ferrimagnetic medium M2, and higher coercivity than the synthetic ferrimagnetic medium M1. Further, it was confirmed that the recording properties such as the signal-to-medium noise $S/N_m$ at 330 kfci, the isolated signal-to-medium noise $S_{iso}/N_m$ at 330 kfci and the overwrite performance are also better for the magnetic recording medium M3 in comparison to the synthetic ferrimagnetic medium M2. Therefore, it was confirmed that the magnetic recording medium M3, that is, the magnetic recording medium according to the present invention, shows the advantages of both the synthetic ferrimagnetic media M1 and M2, while at the same time overcoming the respective deficiencies of the synthetic ferrimagnetic media M1 and M2.

Figure 10:
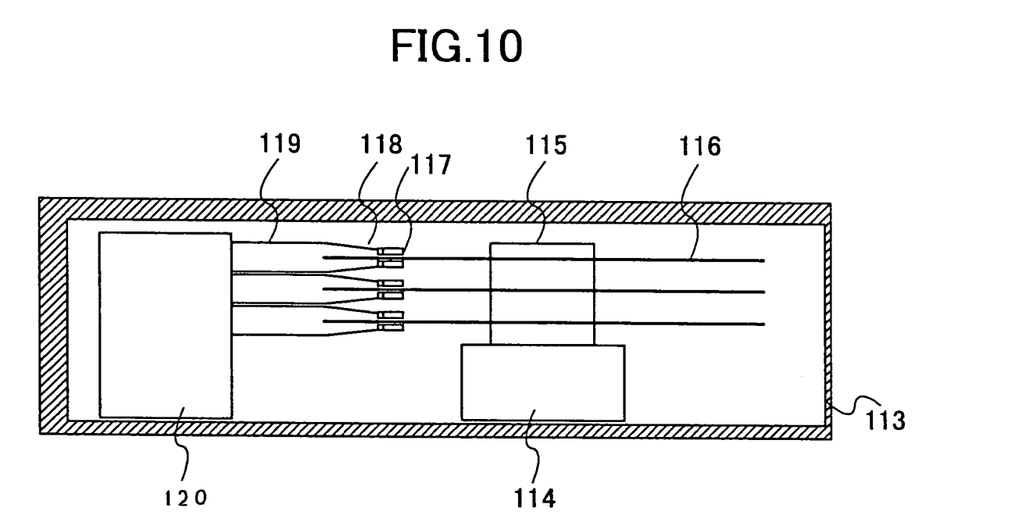
FIG. 10 is a cross sectional view showing the internal structure of an important part of an embodiment of a magnetic storage apparatus according to the present invention.

Next, a description will be given of an embodiment of a magnetic storage apparatus according to the present invention, by referring to FIGS. 10 and 11. FIG. 10 is a cross sectional view showing the internal structure of an important part of this embodiment of the magnetic storage apparatus, and FIG. 11 is a plan view showing the important part of the embodiment of the magnetic storage apparatus shown in FIG. 10.

Figure 11:
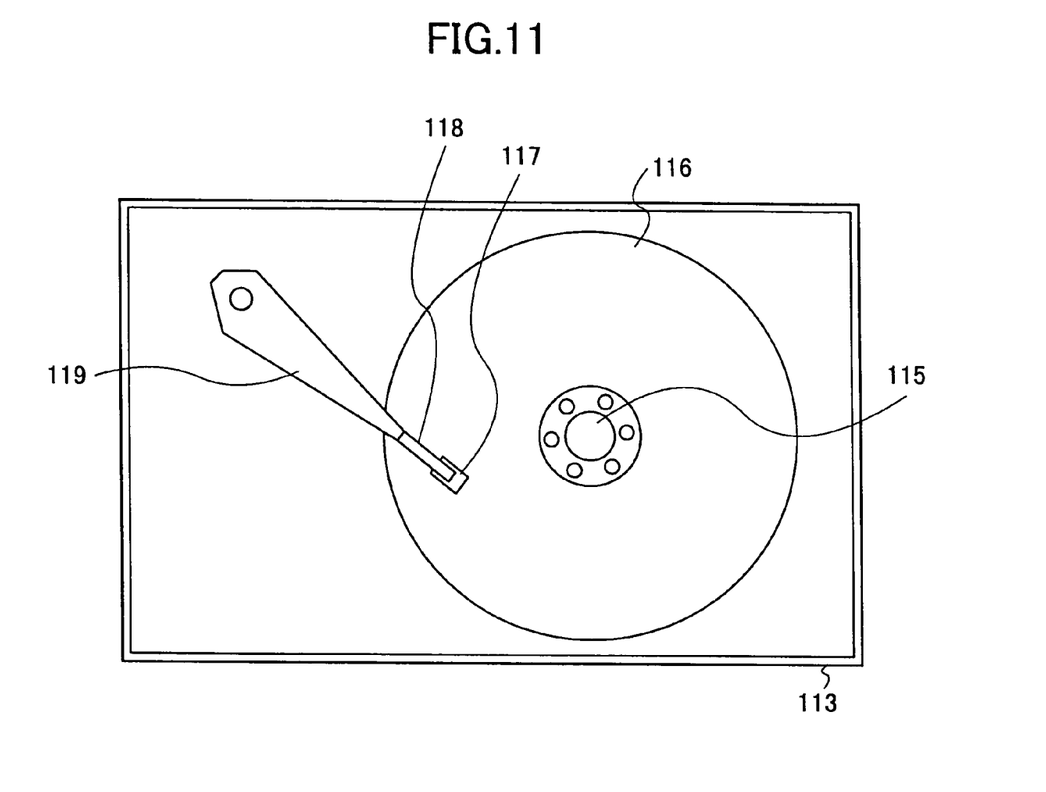
FIG. 11 is a plan view showing the important part of the embodiment of the magnetic storage apparatus shown in FIG. 10.

As shown in FIGS. 10 and 11, the magnetic storage apparatus generally includes a housing 113. A motor 114, a hub 115, a plurality of magnetic recording media 116, a plurality of recording and reproducing heads 117, a plurality of suspensions 118, a plurality of arms 119, and an actuator unit 120 are provided within the housing 113. The magnetic recording media 116 are mounted on the hub 115 which is rotated by the motor 114. The recording and reproducing head 117 is made up of a reproducing head such as a MR and a GMR head, and a recording head such as an inductive head. Each recording and reproducing head 117 is mounted on the tip end of a corresponding arm 119 via the suspension 118. The arms 119 are moved by the actuator unit 120. The basic structure of this magnetic storage apparatus is known, and a detailed description thereof will be omitted in this specification.

This embodiment of the magnetic storage apparatus is characterized by the magnetic recording media 116. Each magnetic recording medium 116 has the structure of any of the embodiments of the magnetic recording medium described above in conjunction with FIGS. 6 through 9. Of course, the number of magnetic recording media 116 is not limited to three, and only one, two or four or more magnetic recording media 116 may be provided.

The basic structure of the magnetic storage apparatus is not limited to that shown in FIGS. 10 and 11. In addition, the magnetic recording medium used in the present invention is not limited to a magnetic disk, and other magnetic recording media such as magnetic tapes and magnetic cards may be used. Moreover, the magnetic recording medium does not need to be fixedly provided within the housing 113 of the magnetic storage apparatus, and the magnetic recording medium may be a portable type medium which is loaded into and unloaded from the housing 113.

Further, the present invention is not limited to these embodiments, but various variations and modifications may be made without departing from the scope of the present invention.

What is claimed is:

1. A magnetic recording medium comprising:
    a lower magnetic layer;
    a nonmagnetic spacer layer disposed on the lower magnetic layer; and
    an upper magnetic layer disposed on the nonmagnetic spacer layer,
    said upper and lower magnetic layers being antiferromagnetically coupled,
    said lower magnetic layer comprising a stabilization layer, and a lower enhancement layer disposed between the stabilization layer and the nonmagnetic spacer layer,
    said stabilization layer and said lower enhancement layer being ferromagnetically exchange coupled,
    wherein the lower enhancement layer is made of a CoCr alloy with $0.1$ at % $\leq Pt \leq 8$ at %, and the stabilization layer is made of a CoCrPt alloy with Pt>8 at %.

2. The magnetic recording medium as claimed in claim 1, wherein the lower enhancement layer has a Co content higher than that of the stabilization layer.

3. The magnetic recording medium as claimed in claim 1, wherein the stabilization layer has a magnetic anisotropy higher than that of the lower enhancement layer.

4. The magnetic recording medium as claimed in claim 1, further comprising:
    a nonmagnetic underlayer on which the lower magnetic layer is disposed.

5. The magnetic recording medium as claimed in claim 1, wherein said upper magnetic layer comprises:
    an upper enhancement layer disposed on the nonmagnetic spacer layer; and
    a recording layer disposed on the upper enhancement layer, said recording layer and said upper enhancement layer being ferromagnetically exchange coupled, wherein the upper enhancement layer is made of a CoCr alloy with 0.1 at % $\leq Pt \leq 8$ at %, and the recording layer is made of a CoCrPt alloy with Pt>8 at %.

6. The magnetic recording medium as claimed in claim 5, wherein the upper enhancement layer has a Co content higher than that of the recording layer.

7. The magnetic recording medium as claimed in claim 5, wherein the recording layer has a magnetic anisotropy higher than that of the upper enhancement layer.

8. A magnetic recording medium comprising:

a lower magnetic layer;

a nonmagnetic spacer layer disposed on the lower magnetic layer; and an upper magnetic layer disposed on the nonmagnetic spacer layer, said upper and lower magnetic layers being antiferromagnetically coupled, said upper magnetic layer comprising an upper enhancement layer disposed on the nonmagnetic spacer layer, and a recording layer disposed on the upper enhancement layer, said recording layer and said upper enhancement layer being ferromagnetically exchange coupled, wherein the upper enhancement layer is made of a CoCr alloy with 0.1 at % $\leq Pt \leq 8$ at %, and the recording layer is made of a CoCrPt alloy with Pt>8 at %.

9. The magnetic recording medium as claimed in claim 8, wherein the upper enhancement layer has a Co content higher than that of the recording layer.

10. The magnetic recording medium as claimed in claim 8, wherein the recording layer has a magnetic anisotropy higher than that of the upper enhancement layer.

11. The magnetic recording medium as claimed in claim 8, further comprising:

a nonmagnetic underlayer on which the lower magnetic layer is disposed.

12. A magnetic storage apparatus comprising:

at least one magnetic recording medium; and a head recording information on and reproducing information from the magnetic recording medium, said magnetic recording medium comprising:

a lower magnetic layer;

a nonmagnetic spacer layer disposed on the lower magnetic layer; and an upper magnetic layer disposed on the nonmagnetic spacer layer, said upper and lower magnetic layers being antiferromagnetically coupled, said lower magnetic layer comprising a stabilization layer, and a lower enhancement layer disposed between the stabilization layer and the nonmagnetic spacer layer, said stabilization layer and said lower enhancement layer being ferromagnetically exchange coupled, wherein the lower enhancement layer is made of a CoCr alloy with 0.1 at % $\leq Pt \leq 8$ at %, and the stabilization layer is made of a CoCrPt alloy with Pt>8 at %.

13. A magnetic storage apparatus comprising:

at least one magnetic recording medium; and a head recording information on and reproducing information from the magnetic recording medium, said magnetic recording medium comprising:

a lower magnetic layer;

a nonmagnetic spacer layer disposed on the lower magnetic layer; and an upper magnetic layer disposed on the nonmagnetic spacer layer, said upper and lower magnetic layers being antiferromagnetically coupled, said upper magnetic layer comprising an upper enhancement layer disposed on the nonmagnetic spacer layer, and a recording layer disposed on the upper enhancement layer, said recording layer and said upper enhancement layer being ferromagnetically exchange coupled, wherein the upper enhancement layer is made of a CoCr alloy with 0.1 at % $\leq Pt \leq 8$ at %, and the recording layer is made of a CoCrPt alloy with Pt>8 at %.

* * * * *